(12) United States Patent
Blouin

(10) Patent No.: US 12,069,089 B2
(45) Date of Patent: Aug. 20, 2024

(54) SYSTEM FOR CALCULATING TRUST OF CLIENT SESSION(S)

(71) Applicant: Microsoft Technology Licensing, LLC, Redmond, WA (US)

(72) Inventor: Joseph Michael Blouin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 256 days.

(21) Appl. No.: 16/702,395

(22) Filed: Dec. 3, 2019

(65) Prior Publication Data

US 2021/0168171 A1    Jun. 3, 2021

(51) Int. Cl.
*H04L 9/40* (2022.01)

(52) U.S. Cl.
CPC ...... *H04L 63/1483* (2013.01); *H04L 63/1416* (2013.01)

(58) Field of Classification Search
CPC ... H04L 9/0643; H04L 9/3236; H04L 9/3239; H04L 9/3271; H04L 63/14; H04L 63/1416; H04L 63/1441; H04L 63/1458; H04L 63/1483; H04L 63/1491; H04L 2209/38; H04L 2209/56
See application file for complete search history.

(56) References Cited

U.S. PATENT DOCUMENTS

| | | | |
|---|---|---|---|
| 7,197,639 B1 * | 3/2007 | Juels | H04L 9/0643 713/168 |
| 7,600,255 B1 | 10/2009 | Baugher | |
| 8,112,483 B1 * | 2/2012 | Emigh | G06F 21/36 709/206 |
| 8,321,955 B2 | 11/2012 | Feng et al. | |
| 9,614,868 B2 | 4/2017 | Yavuz et al. | |
| 9,699,212 B2 | 7/2017 | Adams et al. | |
| 9,942,255 B1 * | 4/2018 | MacDermed | H04L 63/1466 |
| 9,954,891 B2 | 4/2018 | Shiell et al. | |
| 2011/0231913 A1 * | 9/2011 | Feng | G06F 21/46 726/7 |

(Continued)

FOREIGN PATENT DOCUMENTS

WO    2016044105 A1    3/2016

OTHER PUBLICATIONS

Jakobsson, Markus and Ari Juels. "Proofs of Work and Bread Pudding Protocols (Extended Abstract)." (1999). (Year: 1999).*

(Continued)

*Primary Examiner* — Jeremy S Duffield
(74) *Attorney, Agent, or Firm* — Rainier Patents, P.S.

(57) ABSTRACT

Described herein is a system for calculating trust of a client session. A proof of work value is received from a session of a client computer. The proof of work value is calculated by the session of the client computer based, at least in part, upon a work function and input(s) received from service(s) connected to the session. A probability that the session is trustworthy is calculated based, at least in part, upon the proof of work value. Feedback is provided to the session of the client computer based, at least in part, upon the calculated probability. The feedback can increase complexity or frequency of calculation. The feedback can include an update to the work function.

20 Claims, 5 Drawing Sheets

(56) References Cited

U.S. PATENT DOCUMENTS

| | | | | |
|---|---|---|---|---|
| 2012/0066383 | A1* | 3/2012 | Cormode | H04L 43/16 709/224 |
| 2014/0068735 | A1 | 3/2014 | Marinov et al. | |
| 2017/0070534 | A1* | 3/2017 | Bailey | G06F 21/602 |
| 2017/0237766 | A1* | 8/2017 | Mattson | G06F 21/60 726/23 |
| 2017/0237770 | A1* | 8/2017 | Meriac | H04L 67/12 726/23 |
| 2019/0230391 | A1* | 7/2019 | Brown | H04N 21/466 |
| 2019/0303448 | A1* | 10/2019 | Colangelo | G06F 16/958 |
| 2020/0026579 | A1* | 1/2020 | Bahramshahry | G06F 9/5038 |
| 2020/0065853 | A1* | 2/2020 | Cvinar | H04N 21/4781 |
| 2020/0389292 | A1* | 12/2020 | Bartolucci | H04L 9/3239 |

OTHER PUBLICATIONS

Lin, Huijia et al. "A unified framework for concurrent security: universal composability from stand-alone non-malleability." STOC '09 (2009). (Year: 2009).*

Feng, et al., "The Case for Public Work", In Proceedings of IEEE Global Internet Symposium, May 11, 2007, 6 Pages.

Herley, Cormac E.., "Distinguishing Bot Traffic from Human Privileged and Confidential 18 AM/TA/AR Traffic", Application as Filed in U.S. Appl. No. 16/427,081, filed May 30, 2019, 48 Pages.

Juels, et al., "Client Puzzles: A Cryptographic Countermeasure Against Connection Depletion Attacks", In Proceedings of the Network and Distributed System Security Symposium, Jan. 1999, 15 Pages.

Raymond Kaiser, Edward Leo, "Addressing Automated Adversaries of Network Applications", In Thesis of Portland State University, 2010, 156 Pages.

Kaiser et al., "Mod kaPoW: Protecting the Web with Transparent Proof-of-Work", In Proceedings of the IEEE Infocom Workshops, Apr. 13, 2008, 6 Pages.

"International Search Report and Written Opinion Issued in PCT Application No. PCT/US2020/059238", Mailed Date: Feb. 3, 2021, 11 Pages.

* cited by examiner

SYSTEM FOR CALCULATING TRUST OF CLIENT SESSION(S)

BACKGROUND

In many online systems it is a primary concern to ensure that a computer device interacting with a service is doing so on behalf of a real user and not a simulated user (e.g., bot). An example of such a scenario is in view counting for online media content, such as live streams or recorded videos.

Illegitimate users (e.g. bots) generally function by either directly connecting to the underlying service(s) powering the application and sending faked data, or by running a client application in an emulated environment. In either case the goal of the illegitimate user is generally to emulate the behavior of large numbers of legitimate users. This abuse may then be offered and sold as a service or used to further nefarious purposes of the author. The behavior negatively impacts the provider, requires more resources from the provider, and/or can affect the experience and/or value in the product for other users.

Ultimately the goal of the bad actor is to be able to create a large number of simulated clients with a minimal set of computing resources. For example, the more clients that can be simulated with a single resource, the more economically feasible and likely this endeavor is to be profitable.

SUMMARY

Described herein is a system for calculating trust of a client session, comprising: a computer comprising a processor and a memory having computer-executable instructions stored thereupon which, when executed by the processor, cause the computer to: receive a proof of work value from a session of a client computer, wherein the proof of work value is calculated by the session of the client computer based, at least in part, upon a work function and one or more inputs received from one or more services connected to the session; calculate a probability that the session is trustworthy based, at least in part, upon the proof of work value; and provide feedback to the session of the client computer based, at least in part, upon the calculated probability, wherein the feedback comprises an update to the work function.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
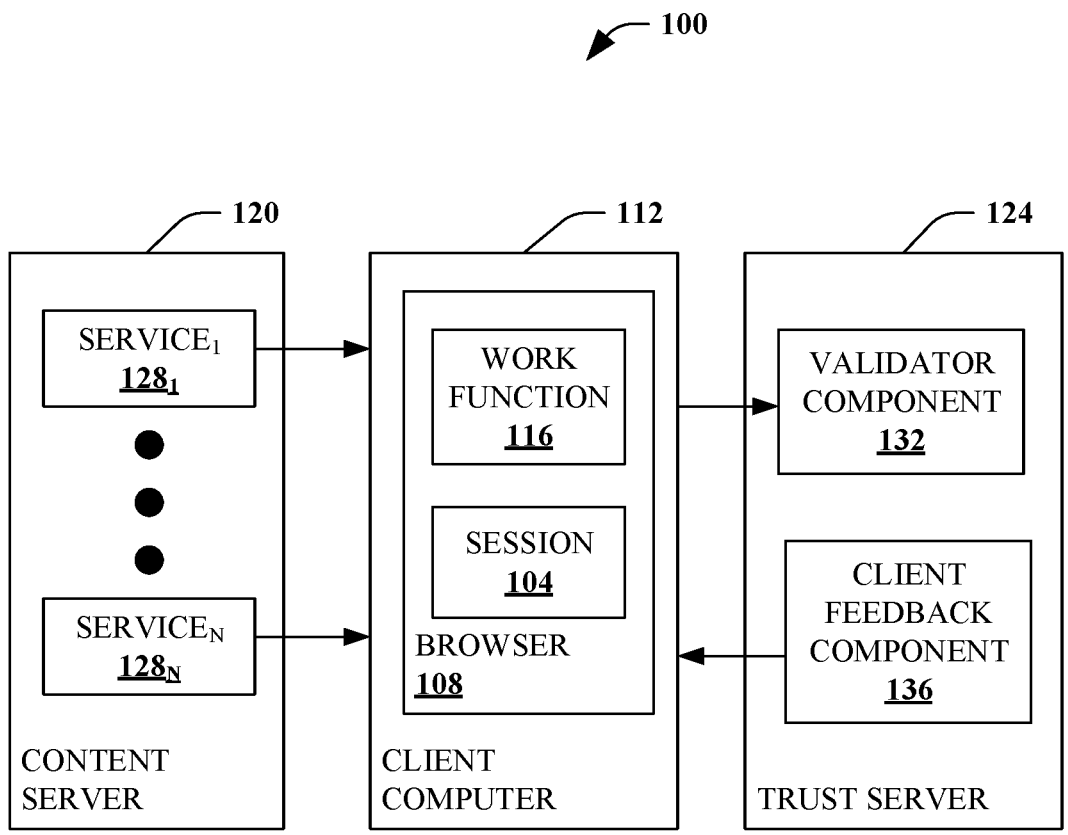
FIG. 1 is a functional block diagram that illustrates a system for calculating trust of a client session.

Various technologies pertaining to calculating trust of a client session are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding calculating probability trust of a client session. What follows are one or more exemplary systems and methods.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

As discussed above, ensuring that a device (e.g., computer, virtual machine, etc.) interacting with a service (e.g., web-based service) is doing so on behalf of a real user and not a simulated user. For example, web-based service can perform view counting for online media content, such as live streams or recorded videos (e.g., quantity of concurrent users currently, historical quantity of users viewing).

The system and method described herein can provide a means of increasing complexity and/or reducing economic viability of creating illegitimate sessions (e.g., a bot). While creating a session in a browser on a client device, a work function can be received (e.g., by the session within the browser). The session can be connected to service(s) via a network connection. The session can receive input(s) from the service(s) (e.g., a chat service, a live-loaded event system service, a video service) connected to the session within the browser. The session can calculate a proof of work value based upon the work function and input(s). The proof of work value can be provided to a trust server.

The trust server can calculate a probability that the session is trustworthy based, at least in part, upon the received proof of work value. Based, at least in part, upon the calculated probability, the trust server can provide feedback to the session. The feedback can comprises an update to the work function (e.g., a different work function, a change to the work function, frequency of calculation of the proof work value, etc.). In some embodiments, when the calculated probability is greater than a session threshold, an action associated with the session can be performed. In some embodiments, the action comprises increasing a view count in a live video or increasing a quantity of views. In some embodiments, the action comprises limiting or sandboxing user interactions.

Referring to FIG. 1, a system for calculating trust of a client session 100 is illustrated. The system 100 can provide a means of increasing complexity and/or reducing economic viability of creating illegitimate sessions (e.g., by a bot).

The system 100 includes a session 104 of a client browser 108 of a client computer 112 (e.g., physical computer and/or VM). While creating the session 104, a work function 116 can be received by the session 104. In some embodiments, the work function 116 can be received from a content server 120. In some embodiments, the work function 116 can be received from a trust server 124.

The session 104 can be connected to service(s) 128 of the content server 120 via a network connection. The session 104 can receive input(s) from the service(s) 128 (e.g., a chat service, a live-loaded event system service, a video service). Using the received input(s) and the work function 116, the session 104 can calculate a proof of work value. The session 104 can provide the proof of work value to the trust server 124.

In some embodiments, input(s) can be provided to the trust server 124 (e.g., from the service(s) 128 and/or the session 104). In some embodiments, input(s) can be generated by the trust server 124 (e.g., common function(s) with service(s) 128). In some embodiments, input(s) can be generated by the trust server 124 (e.g., based, at least in part, upon a unique session and/or user identifier).

The trust server 124 can calculate a probability that the session 104 is trustworthy based, at least in part, upon the received proof of work value. Based, at least in part, upon the calculated probability, the trust server 124 can provide feedback to the session 104. The feedback can comprise an update to the work function 116 (e.g., a different work function, a change to the work function, frequency of calculation of the proof of work value, etc.). In some embodiments, when the calculated probability is greater than a session threshold, an action associated with the session can be performed. In some embodiments, the action comprises increasing a view count in a live video or increasing a quantity of views.

In some embodiments, the session(s) 104 (e.g., client(s)) connect to the service(s) 120 that provide a regular client experience. For example, the service(s) 120 can provide access and/or support to streaming to video(s) (e.g., current and/or recorded). From each service 128, the session 104 receives a unique input which is then combined by the work function 116 on the client computer 112 to produce a proof of work value.

In some embodiments, a key attribute of the work function 116 is that the work function 116 requires input(s) from the service(s) 128 that are unique to a single user (e.g., of a session 104) and/or session 104. In this way, solutions to the work function(s) 116 are not reusable inside and/or outside the context of a single session 104.

Thus, the system 100 requires client computer(s) 112 to perform calculation(s) and/or operation(s) (e.g., via work function 116) designed to tax the session(s) 104 of the client computer(s). In some embodiments, by requiring client computer(s) 112 to perform operation(s) that satisfy the condition(s), as discussed below, illegitimate (e.g., untrustworthy) sessions (e.g., user) can be simulated at a reduced rate. In this manner, the number of sessions 104 (e.g., illegitimate users) a single client computer 112 can simulate can be reduced, for example, by orders of magnitude compared to a system lacking the work function 116.

For example, an nefarious user can provision a large quantity (e.g., ten thousand) virtual machines and associated sessions 104 on a single physical computer to illegitimately increase views of a particular resource (e.g., video via service 128). However, by requiring a session of each of the ten thousand virtual machines to perform a work function based upon input(s) of the particular resource unique to each session 104 (e.g., based upon a unique session identifier of the session), only a small quantity (e.g., one hundred) session 104 can correctly calculate a proof of work value. Accordingly, the trust server 124 can calculate probability the other sessions 104 (e.g., which did not provide correctly proof of work values) are untrustworthy and ultimately (e.g., after several iterations) perform an action associated with the other sessions 104, for example, not including the other sessions 104 in the viewing count and/or not increasing quantity of views based upon the other sessions 104.

The client computer 112 submits the proof of work value to the trust server 124. In some embodiments, the client computer 112 submits the proof of work value at intervals specified by the trust server 124. The trust server 124 then updates confidence in the legitimacy/trustworthy of the session 104 and updates an amount of proof the session 104 (e.g., client) needs to submit in order to increase gain of trust accordingly (e.g., changes to work function 116). This update can then be sent to the session 104 (e.g., client computer 112) as the session 104 continually submits a proof of work value to the trust server 124. In this manner, a feedback loop can be created where well-behaved client(s) (e.g., session(s) 104) are able to reduce corresponding work requirement(s), while poorly-behaved client(s) (e.g., session(s) 104) experience increased pressure.

As discussed above, in some embodiments, inputs to the work function 116 are sourced in part by each of the services 120 a session 104 (e.g., client) must connect to in regular operation. The session 104 (e.g., client) combines the inputs from each of the services 120 and provide inputs as an input to the work function 116.

In some embodiments, receiving inputs from each of the services 120 can require the session 104 to be connected to each of the services 120. This is not a substantial increase for a legitimate user to connect to the services 120 in regular operation. However, requiring an illegitimate user to connect to the services 120 and receive inputs from each of the services 120 can significantly increase system load for the illegitimate user. In some embodiments, development cost of the illegitimate user can be increased. Additionally, more surface area for other solution(s) to analyze client behavior can be provided which can serve as a feedback function for a "trust factor", as discussed below.

In some embodiments, the effect of taking inputs from each of the connections a client creates is additionally effective in a live video service where the video data stream is relatively high-bitrate and further increases system load in a way that does not negatively impact legitimate users. In some embodiments, an illegitimate user is otherwise not required to consumer and/or process the high-bitrate stream. In some embodiments, the system 100 uses at least one source of server-side data to be included in the work function 116. This input can be determined by a process that is opaque to the session 104 (e.g., client) and unpredictable. In this manner, the input(s) cannot be precalculated for a given user, session, date, etc.

As discussed previously, the work function 116 can be received by the session 104. In some embodiments, the work function 116 can be an operation combining each of input(s) that the session 104 (e.g., client) must compute for the duration of the session 104, providing the results to the trust server 124. In some embodiments, the work function 116 can take many inputs ( . . . f) that are specific to the user and/or session 104. In some embodiments, the work function 116 can be designed to tax one or more limited resources of the client computer 112 (e.g., CPU, memory, network, etc.).

In some embodiments, the work function 116 can be implemented in such a way that in normal use the work function 116 does not generate noticeable resource consumption to the user, but is infeasible to run many times in parallel on a single system. For example, if a work function 116 is designed to only use 1/100th of resources of a reasonable system, then a reasonable system can only simulate 100 clients before becoming overwhelmed. In this manner, the work function 116 can be tuned to varying difficulty which can be highly desirable for system designer(s) who want to avoid user interruption while combating bad actor(s).

In some embodiments, the work function 116 can be difficult to run, but yield a result that is far easier to verify as having come from the specified inputs. In some embodiments, the work function 116 can take as an input a "trust factor" variable that can scale the difficulty of the computation required by each session 104 (e.g., client).

As mentioned previously, the work function 116 receives input(s) from one or more services 120. In some embodiments, input(s) are provided to the sessions 104 by multiplexing the input(s) into the data streams from the services 120. For example, video data can be interleaved with user-specific seed value(s) generated by a service 128 and only usable in the work function 116 (e.g., for a short period of time). The work function 116 can utilize the latest set of inputs from each of the data streams (e.g., from the services 128) with the result (e.g., work of proof value) submitted to a validator component 132 of the trust server 124, and, optionally alongside to the inputs used. The validator component 132 can ensure that (1) each of the inputs used was sufficiently recent so as to be valid; and/or (2) each of the inputs used were valid for the user claiming them.

In some embodiments, inputs to the work function 116 can be user-specific as sent by the server 120, otherwise a bad actor could use a single connection to hydrate the inputs for many fake sessions, reducing the impact of consuming the data stream. In some embodiments, inputs can be taken from secrets randomly generated and stored in the source of the application loaded in the session 104. While these secrets can be extracted by bad actors they can be much easier to add to the application source code and change regularly than they are to extract and update by a bad actor.

The trust server 124 can include the validator component 132 and, optionally, a client feedback component 136. The validator component 132 can receive the output of the work function 116 and generates a probability that the session that computed the result is a legitimate user. This probability can be used in generating the trust factor and can be calculated by taking into account factor(s). For explanation and not limitation, the factor(s) can include:

1. The current difficulty (trust factor) for the session 104 such that a session 104 that is providing more work proof has a higher likelihood of being legitimate;
2. The length of the session (e.g., linear or non-linear effect); and/or
3. A ratio of correct, timely answer(s) received to incorrect answer(s).

In some embodiments, a signal and/or observation from and/or about the session 104 can be incorporated into the validator component 132. In some embodiments, the output of the validator component 132 can optionally be combined with other abuse-prevention system(s) to generate an overall probability that the session is trustworthy.

The trust factor is a numerical value used to set the difficulty of the work function 116 required for a specific session 104 to prove its trustworthiness and can be based on the calculated probability of the validator component 132. In some embodiments, the trust factor can also optionally be based on the output of other anti-abuse systems being run in parallel. In general, if the calculated probability of trustworthy is high, the trust factor is reduced, shrinks, and if the calculated probability (e.g., confidence) is low the trust factor is increased.

The trust factor can be calculated in various techniques. Generally, the trust factor can be a numerical value greater than or equal to zero and represents the amount of proof a session 104 (e.g., client) must provide to be trusted. In some embodiments, a trust factor of zero means that a session 104 (e.g., client) does not need to submit proof in order to be trusted. A large trust factor means that a session 104 (e.g., client) needs to provide a significant amount of evidence to be trusted. In some embodiments, a trust factor of zero meaning low confidence is not on its own a significant change, In some embodiments, the trust factor can be provided to the session 104 by the client feedback component 136. A session 104 (e.g., client) that successfully submits proof of trustworthiness at a rate aligned with the trust factor, the trust server 124 will generally reduce the trust factor and the amount of work the session 104 needs to do. Conversely, a session 104 (e.g., client) that fails to provide adequate proof for the trust factor, the trust server 140 will generally cause the factor to increase—requiring yet more proof from the session 104.

The trust factor can be applied in various techniques. In some embodiments, the trust factor can require the session 104 to perform more frequent calculations. For example, a high trust factor can require that the session 104 send more frequent proof of work values to the trust server 124. This may be desirable in a system that generates a large number of inputs to the work function 116. A low trust factor would then mean that a client would not have to compute the work function 116 for each possible input. As an example, if inputs are sent to the session 104 at a rate of one per second, a session 104 with a low trust factor may only need to complete proof of work every sixty seconds, but a session 104 with a high trust factor would need to complete proof of work every second and/or depending on the work function 116, even more frequently.

In some embodiments, the trust factor can require the session 104 to perform more complex calculations. If the work function 116 is of a kind that can easily scale in difficulty the trust factor may be used as an input. For example, a work function 116 that repeats a calculation N times for each validation, where N can be scaled with the trust factor. A lower trust factor may only cause the calculation to be repeated a few times for each input, where a high trust factor would cause the calculation to be repeated many times for the input.

In some embodiments, an initial value of the trust factor for a particular session 104 can be based on one or more of parameters, for example:

1. Whether the user is authenticated with the system;
2. If the user is authenticated, previous trust factor(s);
3. If the user is authenticated, the age of the account;
4. The number of connections from the same network address;
5. The rate of new connections from the same network address;
6. The geolocation of where the connection originates;
7. The provider from which the connection originates; and/or
8. Other trustworthiness or canary system outputs.

In some embodiments, the trust server 124 can place pressure on suspect session(s) 104. A powerful benefit of system 100 is that it allows the system 100 to place resource pressure on suspected bad actor(s) and measure the outcome of doing so. For example, if the system 100 and/or system designer notices unusual activity from a group of sessions 104 (e.g., clients), the trust server 124 can increase their respective trust factors—requiring more resource usage in order to prove their trust. In a real system with limited resources this can cause illegitimate clients to behave poorly and potentially drop connections before a legitimate client would have been overwhelmed.

By combining this practice for identifying suspect sessions 104 (e.g., clients) with the feedback loop component 136 for the trust factor (as described above), a series of sessions 104 (e.g., clients) that fail to provide adequate proof of legitimacy for their trust factor due to system pressure will naturally cause the trust factor to increase—placing greater demands on the session (e.g., client) if it does not catch up with proof of work calculations.

In some embodiments, the function work 116 requirement can have a maximum value. In a real system where users may either erroneously receive a high trust factor and/or where the trust server 124 intentionally places pressure on suspected good clients in order to measure their response, the trust factor maximum can be chosen to not degrade the user experience on a typical device even at its highest value. This yields a trust factor that will only negatively impact a computer system hosting many illegitimate users.

The server 120 can leverage information regarding the trust factor as updated by the trust server 124. This information can be leveraged by the services 128 by informing the services 128 about which sessions 104 (e.g., clients) are trustworthy. How this information is leveraged depends significantly on the providers' specific implementation of the system 100 as well as the resources the server 120 desires to protect.

In some embodiments, the server 120 provides a live video service to a plurality of sessions 104. In a live video service, the number of viewers that are actively watching content and that have ever watched content are key metrics used to promote, measure performance, and pay creators. As such, these "view counts" are a valuable asset that users may be incentivized to abuse by nefarious user(s). In such a service, the trust server 124 can utilize a trust factor of an individual client which can be used to decide whether a particular session 104 (e.g., viewer) is to be counted. For example, a session 104 (e.g., viewer) is only counted when the trust factor is over a certain threshold. The numerical value of the threshold can be pre-defined based upon the validator components 132, inputs, and/or default trust factors. In some embodiments, the threshold can also vary depending on the content that is being watched—some content may warrant higher or lower thresholds due to sensitivity.

In some embodiments, the server 120 can perform account fraud detection. Many services 128 can have problems with user accounts being fraudulently created. The services 128 can be leveraged while users spend time on the site in order to maintain an account-level persistent trust factor that can inform decisions about whether an account is fraudulent by taking into account behavior such as: total time on site, number of sessions, and/or regular usage of the service.

In some embodiments, the trust server 124 can monitor and update trust factor for particular sessions 104 (e.g., users) to help determine legitimate use. For example, sessions 104 (e.g., clients) with a sustained high trust factor can have face account suspension, other punitive action, and/or triggering of explicit anti-bot technique(s).

The system 100 can utilize one or more work function(s) 116. For purposes of explanation and not limitation, the work function 116 can include naïve, Nth-order elliptic curve intersections, bitcoin mining, and/or hashing.

A naïve (passthrough) work function 116 is one that passes various inputs to the validator component 132. This may be effective if the process of retrieving and consuming the inputs themselves is taxing on the session 104 and/or client computer 112, for example, if inputs are interleaved in a high-bitrate data-stream. This also can be a way of increasing the development complexity for a bad actor.

For an Nth-order elliptic curve intersections, given N-inputs from adjacent services 120, the session 104 (e.g., client) can be required to formulate an nth-order equation with intersections on a given elliptic curve at each of the N positions given as inputs. This algorithm can be feasible with a high number of distinct inputs which is relatively easily verified and can operate on random inputs.

A cryptocurrency miner work function 116 can compute hashes against a blockchain on the client computer 112, submitting correct hashes to the trust server 124 and, optionally, creating a second revenue source. The miner essentially hashes random inputs searching for a result with a specific characteristic desired by the network. This can be a time and CPU intensive problem. It is time intensive because every input to the hash function has an equivalent and low random chance of satisfying the desired output criteria—meaning the session 104 can compute many hashes for a reasonable chance of finding a solution.

The input to the cryptocurrency miner algorithm is in part a piece of known data (which can be unique to the user or session 104) as well as a piece of data generated by the client. The session 104 (e.g., client) can search for a solution that can be found at a probability aligned with the trust factor. A session 104 (e.g., client) can then submit the input values to any solutions it finds that align with the search algorithm to the trust server 124 as proof that it found a solution, which can be easily verified by the trust server 124. When a session 104 (e.g., client) finds a solution to the bitcoin problem it can submit that solution to the server 120 so that the service 128 can claim the income.

In some embodiments, the work function 116 can include a hashing function of the cryptocurrency technique (as discussed above), for example, SHA1, SHA2, SHA256, SHA384, SHA512, MD5, BLAKE2, Keccak, and/or GOST.

Figure 2:
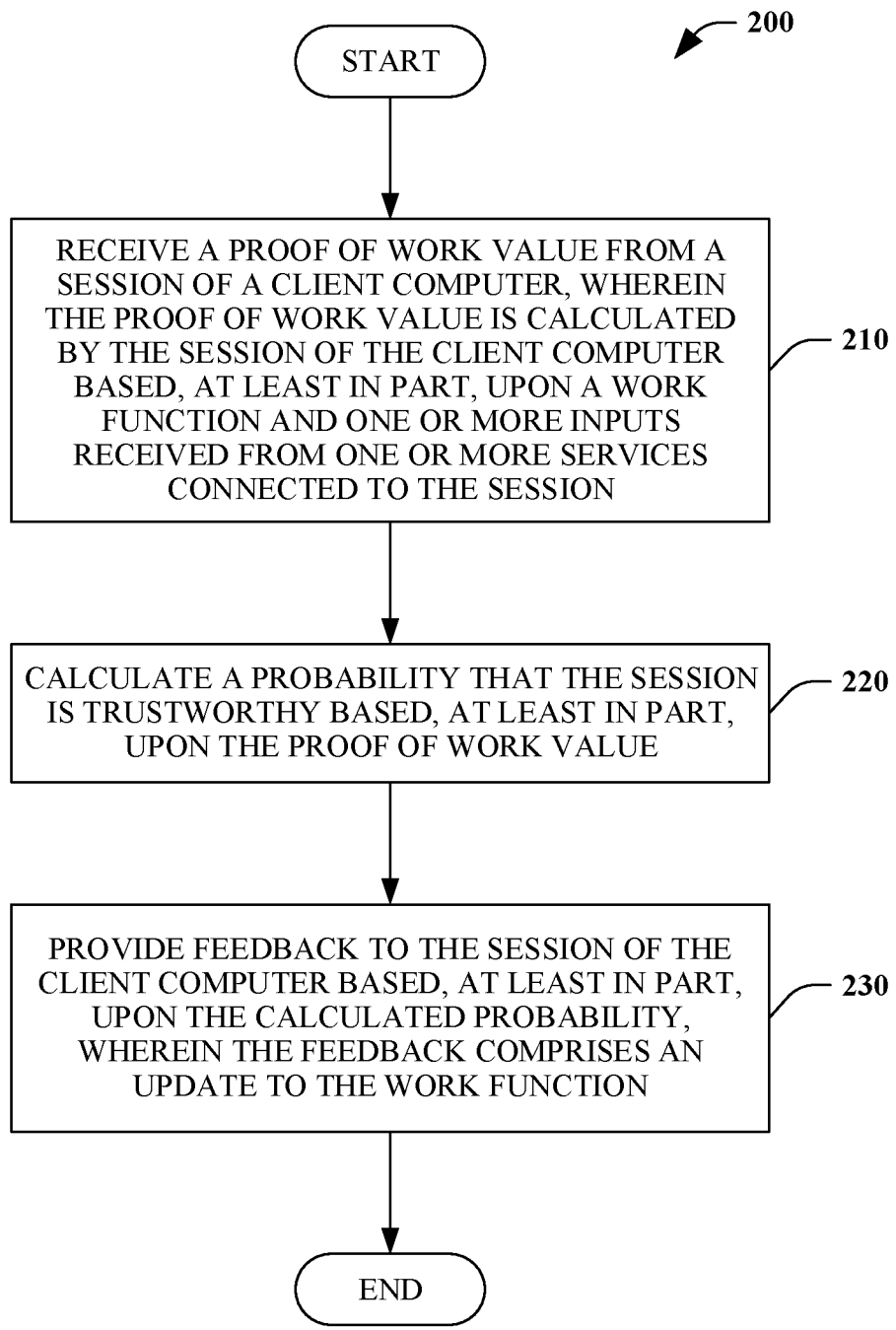
FIG. 2 is a flow chart that illustrates a method for calculating trust of a client session.
Figure 3:
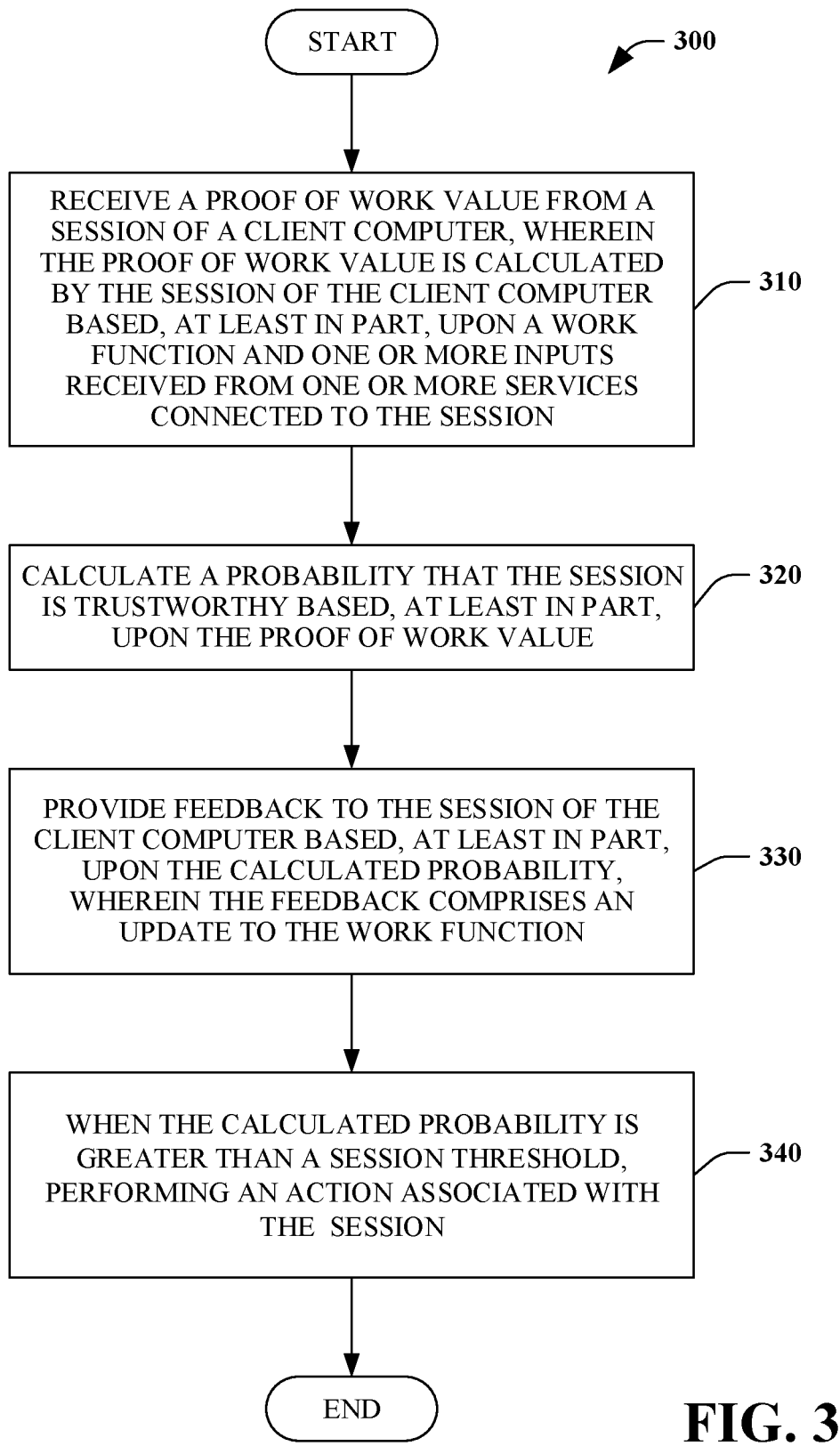
FIG. 3 is a flow chart that illustrates a method for calculating trust of a client session.
Figure 4:
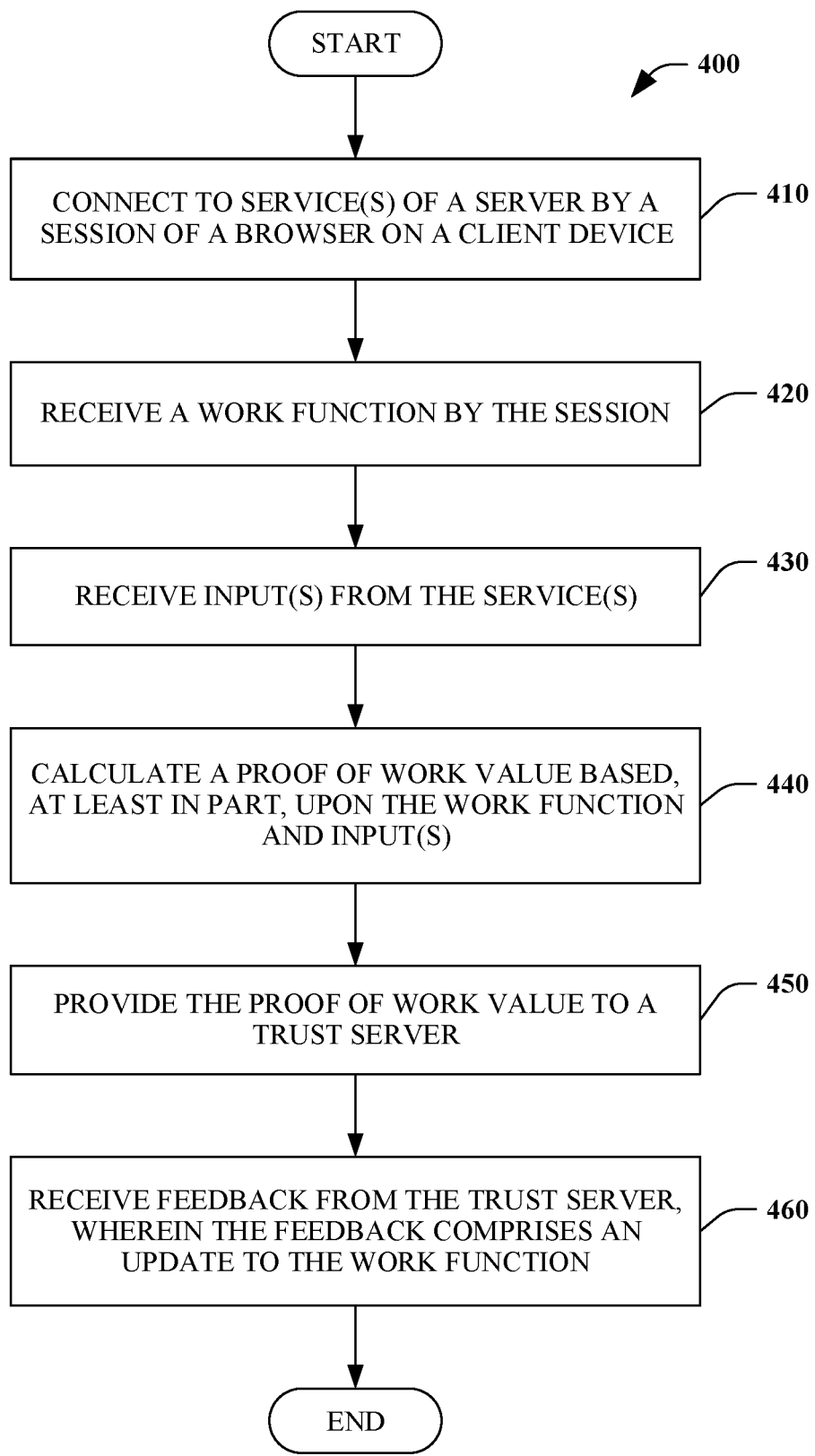
FIG. 4 is a flow chart that illustrates a method of generating a proof of work value.

FIGS. 2-4 illustrate exemplary methodologies relating to calculating probability of confidence of client legitimacy.

While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 2, a method for calculating trust of a client session 200 is illustrated. In some embodiments, the method 200 is performed by the trust server 124.

At 210, a proof of work value is received from a session of a client computer. The proof of work value is calculated by the session of the client computer based, at least in part, upon a work function and input(s) received from service(s) connected to the session.

At 220, a probability that the session is trustworthy is calculated based, at least in part, upon the proof of work value. At 230, feedback is provided to the session of the client computer based, at least in part, upon the calculated probability. The feedback comprises an update to the work function 116 (e.g., changed work function 116, updated work function 116, and/or frequency of calculation performed).

Turning to FIG. 3, a method for calculating trust of a client session 300 is illustrated. In some embodiments, the method 300 is performed by the trust server 124.

At 310, a proof of work value is received from a session of a client computer, wherein the proof of work value is calculated by the session of the client computer based, at least in part, upon a work function and input(s) received from service(s) connected to the session. At 320, a probability that the session is trustworthy is calculated based, at least in part, upon the proof of work value.

At 330, feedback is provided to the session of the client computer based, at least in part, upon the calculated probability. The feedback comprises an update to the work function 116 (e.g., changed work function 116, updated work function 116, and/or frequency of calculation performed). At 340, when the calculated probability is greater than a session threshold, an action associated with the session is performed.

Next, turning to FIG. 4, a method of generating a proof of work value 400 is illustrated. In some embodiments, the method 400 is performed by the client computer 112.

At 410, service(s) of a server are connected by a session of a browser on a client device. At 420, a work function is received by the session. At 430, input(s) are received from the service(s).

At 440, a proof of work value is calculated based, at least in part, upon the work function and the input(s). At 450, the proof of work value is provided to a trust server. At 460, feedback is received from the trust server. The feedback comprises an update to the work function. In some embodiments, acts 430, 440, 450, and 460 are performed iteratively.

Aspects of the subject disclosure pertain to the technical problem of determine likelihood that a session is associated with an illegitimate computer/user. The technical features associated with addressing this problem involve receiving a proof of work value from a session of a client computer. The proof of work value is calculated by the session of the client computer based, at least in part, upon a work function and one or more inputs received from one or more services connected to the session. A probability that the session is trustworthy is calculated based, at least in part, upon the proof of work value. Feedback is provided to the session of the client computer based, at least in part, upon the calculated probability. The feedback comprises an update to the work function. Accordingly, aspects of these technical features exhibit technical effects of more efficiently and effectively determining likelihood that the session is associated with an illegitimate computer/user, for example, reducing bandwidth and/or server computing resource(s).

Described herein is a system for calculating trust of a client session, comprising: a computer comprising a processor and a memory having computer-executable instructions stored thereupon which, when executed by the processor, cause the computer to: receive a proof of work value from a session of a client computer, wherein the proof of work value is calculated by the session of the client computer based, at least in part, upon a work function and one or more inputs received from one or more services connected to the session; calculate a probability that the session is trustworthy based, at least in part, upon the proof of work value; and provide feedback to the session of the client computer based, at least in part, upon the calculated probability, wherein the feedback comprises an update to the work function.

The memory can further include computer-executable instructions stored thereupon which, when executed by the processor, cause the computer to: when the calculated probability is greater than a session threshold, perform an action associated with the session. The system can further include wherein the action associated with the session comprises increasing at least one of a view count in a live video or increasing a quantity of views. The system can further include wherein the action associated with the session comprises at least one of limiting user interactions or sandboxing user interactions.

The system can further include wherein the update to the work function comprises a different work function provided to the session. The system can further include wherein the update to the work function comprises a change to frequency or complexity of calculation of the proof of work value by the session. The memory can further include computer-executable instructions stored thereupon which, when executed by the processor, cause the computer to: provide the work function to the session, wherein the work function comprises a naïve work function.

The memory can further include computer-executable instructions stored thereupon which, when executed by the processor, cause the computer to: provide the work function to the session, wherein the work function comprises an Nth order elliptic curve intersections work function. The memory can further include computer-executable instructions stored thereupon which, when executed by the processor, cause the computer to: provide the work function to the session, wherein the work function comprises a hashing work function.

Described herein is a method for trust of a client session, comprising: receiving a proof of work value from a session of a client computer, wherein the proof of work value is calculated by the session of the client computer based, at least in part, upon a work function and one or more inputs received from one or more services connected to the session; calculating a probability that the session is trustworthy based, at least in part, upon the proof of work value;

providing feedback to the session of the client computer based, at least in part, upon the calculated probability, wherein the feedback comprises an update to the work function; and when the calculated probability is greater than a session threshold, performing an action associated with the session.

The method can further include wherein the action associated with the session comprises increasing a view count in a live video. The method can further include wherein the action associated with the session comprises increasing a quantity of views. The method can further include wherein the update to the work function comprises a different work function provided to the session.

The method can further include wherein the update to the work function comprises a change to frequency of calculation of the proof of work value by the session. The method can further include providing the work function to the session. The method can further include wherein the work function comprises a naïve work function, an Nth order elliptic curve intersections work function, or a hashing work function.

Described herein is a computer storage medium storing computer-readable instructions that when executed cause a computing device to: receive a proof of work value from a session of a client computer, wherein the proof of work value is calculated by the session of the client computer based, at least in part, upon a work function and one or more inputs received from one or more services connected to the session; calculate a probability that the session is trustworthy based, at least in part, upon the proof of work value; and provide feedback to the session of the client computer based, at least in part, upon the calculated probability, wherein the feedback comprises an update to the work function.

The computer storage medium can store further computer-readable instructions that when executed cause the computing device to: when the calculated probability is greater than a session threshold, perform an action associated with the session. The computer storage medium can further comprise wherein the action associated with the session comprises increasing a view count in a live video. The computer storage medium can further comprise wherein the action associated with the session comprises increasing a quantity of views.

Figure 5:
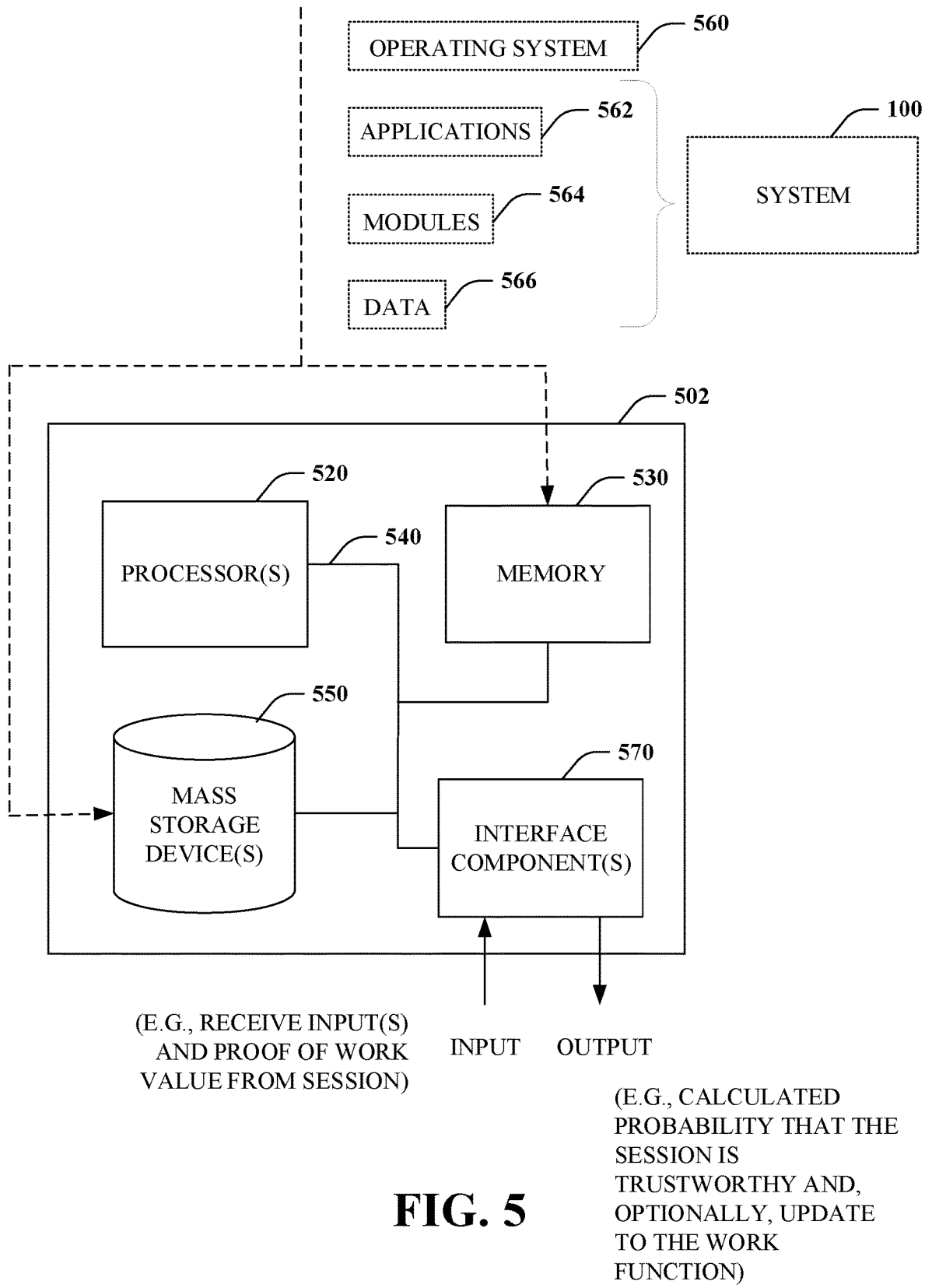
FIG. 5 is a functional block diagram that illustrates an exemplary computing system.

With reference to FIG. 5, illustrated is an example general-purpose computer or computing device 502 (e.g., mobile phone, desktop, laptop, tablet, watch, server, handheld, programmable consumer or industrial electronics, set-top box, game system, compute node, etc.). For instance, the computing device 502 may be used in a system 100 and/or trust server 124.

The computer 502 includes one or more processor(s) 520, memory 530, system bus 540, mass storage device(s) 550, and one or more interface components 570. The system bus 540 communicatively couples at least the above system constituents. However, it is to be appreciated that in its simplest form the computer 502 can include one or more processors 520 coupled to memory 530 that execute various computer executable actions, instructions, and or components stored in memory 530. The instructions may be, for instance, instructions for implementing functionality described as being carried out by one or more components discussed above or instructions for implementing one or more of the methods described above.

The processor(s) 520 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 520 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 520 can be a graphics processor.

The computer 502 can include or otherwise interact with a variety of computer-readable media to facilitate control of the computer 502 to implement one or more aspects of the claimed subject matter. The computer-readable media can be any available media that can be accessed by the computer 502 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 502. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 530 and mass storage device(s) 550 are examples of computer-readable storage media. Depending on the exact configuration and type of computing device, memory 530 may be volatile (e.g., RAM), non-volatile (e.g., ROM, flash memory, etc.) or some combination of the two. By way of example, the basic input/output system (BIOS), including basic routines to transfer information between elements within the computer 502, such as during start-up, can be stored in nonvolatile memory, while volatile memory can act as external cache memory to facilitate processing by the processor(s) 520, among other things.

Mass storage device(s) 550 includes removable/non-removable, volatile/non-volatile computer storage media for storage of large amounts of data relative to the memory 530. For example, mass storage device(s) 550 includes, but is not limited to, one or more devices such as a magnetic or optical disk drive, floppy disk drive, flash memory, solid-state drive, or memory stick.

Memory 530 and mass storage device(s) 550 can include, or have stored therein, operating system 560, one or more applications 562, one or more program modules 564, and data 566. The operating system 560 acts to control and allocate resources of the computer 502. Applications 562 include one or both of system and application software and can exploit management of resources by the operating system 560 through program modules 564 and data 566 stored in memory 530 and/or mass storage device (s) 550 to perform one or more actions. Accordingly, applications 562 can turn a general-purpose computer 502 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 562, and include one or more modules 564 and data 566 stored in memory and/or mass storage device(s) 550 whose functionality can be realized when executed by one or more processor(s) 520.

In some embodiments, the processor(s) 520 can correspond to a system on a chip (SOC) or like architecture including, or in other words integrating, both hardware and software on a single integrated circuit substrate. Here, the processor(s) 520 can include one or more processors as well as memory at least similar to processor(s) 520 and memory 530, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 502 also includes one or more interface components 570 that are communicatively coupled to the system bus 540 and facilitate interaction with the computer 502. By way of example, the interface component 570 can be a port (e.g. serial, parallel, PCMCIA, USB, FireWire, etc.) or an interface card (e.g., sound, video, etc.) or the like. In one example implementation, the interface component 570 can be embodied as a user input/output interface to enable a user to enter commands and information into the computer 502, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 570 can be embodied as an output peripheral interface to supply output to displays (e.g., LCD, LED, plasma, etc.), speakers, printers, and/or other computers, among other things. Still further yet, the interface component 570 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
a processor; and
a memory having computer-executable instructions stored thereupon which, when executed by the processor, cause the system to:
receive different proof of work values from different sessions executing concurrently on a client computer, wherein the different proof of work values are calculated repeatedly by the different sessions by processing different inputs using a work function, the different inputs being received from a service connected to the different sessions, the different inputs being specifically associated with the different sessions and distinguishing individual sessions from other sessions executing concurrently on the client computer;
calculate respective probabilities that the different sessions are trustworthy based, at least in part, upon the different proof of work values;
provide different feedback to the different sessions on the client computer based, at least in part, upon the respective probabilities, wherein the feedback comprises a particular update to the work function for a particular session; and
when a particular calculated probability for the particular session is greater than a session threshold, perform an action associated with the particular session,
wherein the action associated with the particular session comprises increasing at least one of a view count in a live video or increasing a quantity of views.

2. The system of claim 1, wherein the action associated with the particular session further comprises at least one of limiting user interactions or sandboxing user interactions.

3. The system of claim 1, wherein the particular update to the work function comprises a different work function provided to the particular session.

4. The system of claim 1, wherein the particular update to the work function comprises a change to frequency with which the proof of work values are repeatedly calculated by the particular session.

5. The system of claim 1, the memory having further computer-executable instructions stored thereupon which, when executed by the processor, cause the system to:
provide the work function to the particular session, wherein the work function comprises a naïve work function.

6. The system of claim 1, the memory having further computer-executable instructions stored thereupon which, when executed by the processor, cause the system to:
provide the work function to the particular session, wherein the work function comprises an Nth order elliptic curve intersections work function.

7. The system of claim 1, the memory having further computer-executable instructions stored thereupon which, when executed by the processor, cause the system to:

provide the work function to the particular session, wherein the work function comprises a hashing work function.

8. A method comprising:

receiving different proof of work values from different sessions executing concurrently on a client computer, wherein the different proof of work values are calculated repeatedly by the different sessions by processing different inputs using a work function, the different inputs being received from a service connected to the different sessions, the different inputs being specifically associated with the different sessions and distinguishing individual sessions from other sessions executing concurrently on the client computer;

determining respective confidence values that the different sessions are trustworthy based, at least in part, upon the proof of work values;

providing different feedback to the different sessions on the client computer based, at least in part, upon the respective confidence values; and when a particular confidence value for a particular session is greater than a session threshold, performing an action associated with the particular session, wherein the action associated with the particular session comprises increasing at least one of a view count in a live video or increasing a quantity of views.

9. A computer storage medium storing computer-readable instructions that, when executed, cause a computing device to:

receive different proof of work values from different sessions executing concurrently on a client computer, wherein the different proof of work values are calculated repeatedly by the different sessions by processing different inputs using a work function, the different inputs being received from a service connected to the different sessions, the different inputs being specifically associated with the different sessions to distinguish the different sessions from other sessions executing concurrently on the client computer;

calculate respective probabilities that the different sessions are trustworthy based, at least in part, upon the different proof of work values;

provide different feedback to the different sessions on the client computer based, at least in part, upon the respective probabilities, wherein the feedback comprises a particular update to the work function for a particular session; and when a particular calculated probability for the particular session is greater than a session threshold, perform an action associated with the particular session, wherein the action associated with the particular session comprises increasing at least one of a view count in a live video or increasing a quantity of views.

10. The method of claim 8, further comprising:

receiving another proof of work value from another session of the different sessions executing concurrently on the client computer, wherein the another proof of work value is calculated by the another session based, at least in part, upon the work function and another input received from the service, the another input being specifically associated with the another session and different from other inputs provided by the service to other sessions;

determining another confidence that the another session is trustworthy based, at least in part, upon the another proof of work value;

providing other feedback to the another session of the client computer based, at least in part, upon the another confidence, wherein the other feedback comprises another update to the work function; and based at least on the another confidence, performing another action associated with the another session.

11. The system of claim 1, wherein the different sessions are implemented by different virtual machines executing concurrently on the client computer, the different virtual machines repeatedly calculate the different proof of work values while connected to the service, and the different virtual machines are assigned changing inputs over time to process using the work function.

12. The system of claim 1, the memory having further computer-executable instructions stored thereupon which, when executed by the processor, cause the system to:

based at least on the particular calculated probability that the particular session is trustworthy, repeatedly adjust computational difficulty of the particular update to the work function, wherein the computational difficulty is increased as the particular calculated probability that the particular session is trustworthy decreases, and the computational difficulty is decreased as the particular calculated probability that the particular session is trustworthy increases.

13. The system of claim 1, wherein each of the different sessions executing concurrently on the client computer repeatedly calculates respective proof of work values according to the work function on respective session-specific inputs that change over time.

14. The system of claim 13, the memory having further computer-executable instructions stored thereupon which, when executed by the processor, cause the system to:

repeatedly over time, calculate respective probabilities that each of the different sessions executing concurrently on the client computer is trustworthy based at least on the respective proof of work values; and repeatedly provide feedback to the different sessions executing concurrently on the client computer based, at least in part, upon the respective probabilities, wherein the feedback comprises multiple updates to the work function for at least two of the different sessions.

15. The system of claim 14, wherein the respective session-specific inputs for each of the different sessions executing concurrently on the client computer are valid for a limited time period.

16. The system of claim 15, the memory having further computer-executable instructions stored thereupon which, when executed by the processor, cause the system to:

calculate the respective probabilities that each of the different sessions executing concurrently on the client computer is valid based at least on whether the respective session-specific inputs used to calculate the respective proof of work values are sufficiently recent according to the limited time period for which the respective session-specific inputs are valid.

17. The system of claim 16, wherein the respective session-specific inputs are multiplexed into respective session-specific video streams sent by the service to the respective sessions.

18. The system of claim 1, the memory having further computer-executable instructions stored thereupon which, when executed by the processor, cause the system to:

send, to the client computer, a specified interval at which respective proof of work values are submitted to the system.

19. The system of claim 1, the work function being configured to utilize a specified portion of processing resources available on the client computer.

20. The system of claim 1, the work function being configured to utilize a specified portion of memory resources available on the client computer.

* * * * *